US008806540B2

(12) United States Patent
Roberts et al.

(10) Patent No.: US 8,806,540 B2
(45) Date of Patent: Aug. 12, 2014

(54) INTERACTIVE MEDIA CONTENT PRESENTATION SYSTEMS AND METHODS

(75) Inventors: Brian F. Roberts, Dallas, TX (US); Kristopher T. Frazier, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 13/104,910

(22) Filed: May 10, 2011

(65) Prior Publication Data

US 2012/0291059 A1 Nov. 15, 2012

(51) Int. Cl.
*G06F 3/00* (2006.01)
*G06F 13/00* (2006.01)
*H04N 5/445* (2011.01)

(52) U.S. Cl.
USPC .................... 725/61; 725/38; 725/40

(58) Field of Classification Search
USPC .............................. 725/38, 40, 61
See application file for complete search history.

(56) References Cited

U.S. PATENT DOCUMENTS

| 7,818,768 | B2* | 10/2010 | Blackketter et al. | 725/52 |
|---|---|---|---|---|
| 2007/0107010 | A1* | 5/2007 | Jolna et al. | 725/34 |
| 2008/0276266 | A1* | 11/2008 | Huchital et al. | 725/32 |
| 2009/0037961 | A1* | 2/2009 | Green et al. | 725/87 |
| 2010/0154000 | A1* | 6/2010 | Macrae et al. | 725/41 |
| 2011/0047487 | A1* | 2/2011 | Deweese et al. | 715/758 |
| 2011/0209191 | A1* | 8/2011 | Shah | 725/136 |
| 2012/0151525 | A1* | 6/2012 | Demchenko et al. | 725/39 |
| 2012/0266089 | A1* | 10/2012 | Shah | 715/760 |

* cited by examiner

*Primary Examiner* — Nnenna Ekpo

(57) ABSTRACT

Exemplary interactive media content presentation systems and methods are disclosed herein. An exemplary method includes an interactive media content presentation system presenting a media content instance on a display screen associated with a media content access device, detecting, during the presentation of the media content instance, an interaction by a user with the media content instance being presented on the display screen and representing a request to access enhanced content related to the media content instance by way of the display screen, and dynamically transitioning, in response to the request, from presenting the media content instance on the display screen to presenting an interactive portal on the display screen, the interactive portal comprising a continued presentation of the media content instance and the enhanced content. Corresponding systems and methods are also disclosed.

25 Claims, 12 Drawing Sheets

INTERACTIVE MEDIA CONTENT PRESENTATION SYSTEMS AND METHODS

BACKGROUND INFORMATION

Advances in electronic communications technologies have facilitated widespread distribution of media content. To illustrate, users are increasingly using personal computers, handheld devices, mobile phones, set-top box devices, and other media content access devices to access and experience various types of media content (e.g., television programs, movies, etc.).

In some instances, users would be interested in an interactive media content experience. However, traditional media content experiences are largely passive in nature and fail to engage and/or facilitate interaction by the user. For example, in a traditional media content experience, a user merely passively views what is being presented without any interaction beyond choosing what media content to view (e.g., choosing which media programming channel or recorded media content instance to watch). Accordingly, traditional media content viewing experiences lack the richness and attraction of a truly interactive media content viewing experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
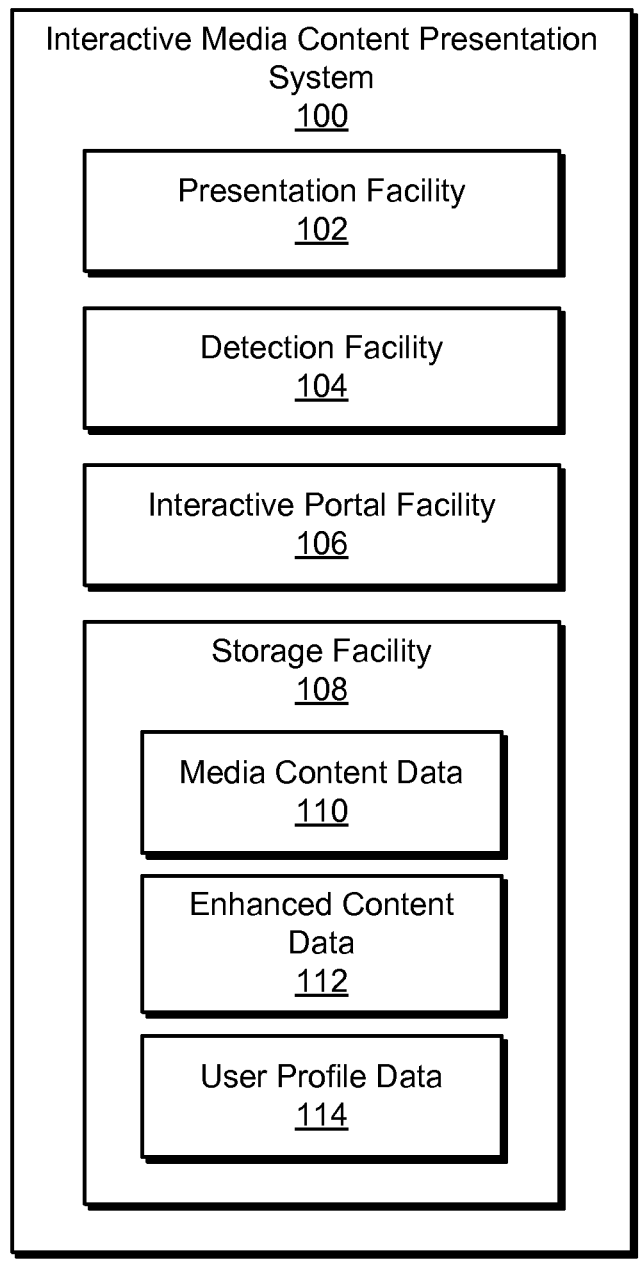
FIG. 1 illustrates an exemplary interactive media content presentation system according to principles described herein.

Exemplary interactive media content presentation systems and methods are disclosed herein. In some examples, an interactive media content presentation system may present an interactive media content instance on a display screen associated with a media content access device. The interactive media content instance may be configured to serve as a gateway to enhanced content related to and temporally synchronized with the media content instance. For example, a user may touch or otherwise interact with the media content instance being displayed on the display screen in order to request access to enhanced content related to and temporally synchronized with the media content instance. In response to the request, the interactive media content presentation system may dynamically transition from presenting the media content instance on the display screen to presenting an interactive portal on the display screen. As will be illustrated below, the interactive portal may include both a continued presentation of the media content instance and the enhanced content.

As will be described in more detail below, the methods and systems disclosed herein may provide a user with an interactive, enhanced, enriched, and/or personalized media content viewing experience. To illustrate, a user may be watching a broadcast of a sporting event (or any other media content instance) on a display screen (e.g., a touch screen). At any time during the presentation of the sporting event, the user may interact with the presentation of the sporting event on the display screen (e.g., by performing a touch gesture on the display screen) to selectively display an interactive portal on the display screen. The interactive portal may include a continued presentation of the sporting event along with enhanced content related to and temporally synchronized with the sporting event. For example, the enhanced content may include real-time statistics associated with the sporting event, advertisement content associated with and temporally synchronized with the sporting event (e.g., one or more advertisements associated with a particular team that is on offense in the sporting event), and/or real-time social media content associated with the sporting event.

The methods and systems disclosed herein may also provide a service provider (e.g., a television network service provider) with an ability to more effectively gauge user interest in a particular media content instance, foster user loyalty, increase brand awareness, and/or increase revenue. For example, a service provider may monitor a user's interaction with various media content instances and enhanced content related thereto and use the resulting data to more effectively select enhanced content to be presented to the user. Additional benefits and/or advantages will be apparent from the details disclosed herein.

As used herein, "media content" may refer generally to any video content accessible via a media content access device. The term "media content instance" will be used herein to refer to any television program, on-demand media program, pay-per-view media program, broadcast media program (e.g., broadcast television program), IPTV media content, advertisement (e.g., commercial), video, or any segment, component, or combination of these or other forms of media content that may be viewed or otherwise experienced by a user.

As used herein, the term "interactive portal" may refer generally to a graphical user interface configured to include and/or be provided in conjunction with the presentation of a media content instance. The interactive portal may additionally or alternatively include enhanced content related to a media content instance being presented within the interactive portal. As will be described below, an interactive portal may be selectively accessed by a user during the presentation of a media content instance. Additionally or alternatively, an interactive portal may be configured to dynamically change in accordance the media content instance being presented within the interactive portal, as will be explained in more detail below.

As used herein, the term "enhanced content" may refer generally to any instance of content that may be related to a media content instance and that may be displayed within an interactive portal. Enhanced content may include metadata content, advertisement content, social media content, and/or any other suitable content related to a media content instance.

Exemplary interactive media content presentation systems and methods will now be described in reference to the drawings.

FIG. 1 illustrates an exemplary interactive media content presentation system 100 (or simply "system 100"). As will be described in more detail below, system 100 may be configured to present media content to a user in an interactive manner.

System 100 may include, but is not limited to, a presentation facility 102, a detection facility 104, an interactive portal facility 106, and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

Presentation facility 102 may be configured to present media content for experiencing by a user. For example, presentation facility 102 may be configured to present a media content instance on a display screen associated with a media content access device (e.g., integrated into the media content access device or communicatively coupled to the media content access device). A presentation of a media content instance may be performed in any suitable manner such as by generating and/or providing output signals representative of the media content instance to a display device (e.g., a television device, a touch screen device). Additionally or alternatively, presentation facility 102 may present a media content instance by providing data representative of the media content instance to a media content access device configured to present (e.g., display) the media content instance. In some examples, presentation facility 102 may present a media content instance by way of a set-top box device and/or in accordance with a broadcast of the media content instance (e.g., by way of a broadcast television network). In additional or alternative examples, presentation facility 102 may be configured to present the media content instance independent of and/or in the absence of a web browser and/or the World Wide Web, but not necessarily independent of the Internet.

In certain embodiments, presentation facility 102 may be configured to transition from a presentation of one media content instance to a presentation of another media content instance. For example, presentation facility 102 may present a media content instance (e.g., a television program) including one or more advertisement breaks during which presentation facility 102 may transition to and present one or more advertisements (e.g., commercials). As will be described in more detail below, an interactive portal and/or enhanced content included in the interactive portal may be dynamically modified (e.g., updated) in accordance with a transition from a presentation of one media content instance to a presentation of another media content instance.

In some examples, a media content instance presented by presentation facility 102 may be configured to serve as a gateway to enhanced content related to and/or temporally synchronized with the media content instance. As mentioned, enhanced content may include metadata content, advertisement content, social media content and/or any other type of content related to a media content instance. Metadata content may include any content based on metadata associated with a media content instance. Exemplary metadata content may include statistical content associated with a sporting event or any other type of event, content associated with one or more media content instances related to the media content instance (e.g., one or more episodes of a television series), chapter information, ratings information, video format information, closed captioning content, etc. Advertising content may include one or more advertisements associated with the media content instance. Social media content may include any social media content associated with the media content instance, one or more users, one or more vendors, etc.

A media content instance may be configured to serve as a gateway to enhanced content in any suitable manner and by any suitable entity (e.g., a service provider and/or a media content provider). For example, a media content instance may be converted into an interactive media content instance by associating or linking it with one or more instances of enhanced content that may be accessed in response to one or more types of interactions by a user with the media content instance. A media content instance may be configured to serve as a gateway to enhanced content in any other manner as may serve a particular implementation.

Detection facility 104 may be configured to detect an interaction by a user with a media content instance being presented on a display screen. The interaction may represent a request to access enhanced content related to the media content instance and may be provided and/or detected in any suitable manner. For example, the interaction may be provided by a user by way of a remote control device, a touch screen device, a keypad, and/or any other suitable input device. To illustrate, the interaction may comprise the pressing of a button on a remote control device while the media content instance is being presented on the display screen. In situations where the display screen comprises a touch screen, the interaction may include one or more touch gestures (e.g., a pinch touch gesture, a reverse-pinch touch gesture, a tap touch gesture, etc.) provided by way of the touch screen while the media content instance is being presented on the touch screen.

In some examples, an interaction may be performed with respect to a particular object (e.g., a person, place, or thing) portrayed during a presentation of the media content instance on the display screen. Detection facility 104 may detect such a targeted interaction and direct interactive portal facility 106 to select and present enhanced content related to the particular object. For example, detection facility 104 may detect an interaction by a user with a particular character included in a movie (e.g., a touching by the user of a graphical portrayal of the character within a presentation of the movie). In response, interactive portal facility 106 may present enhanced content associated with the character within an interactive portal.

Interactive portal facility 106 may be configured to manage (e.g., generate, present, update, etc.) an interactive portal configured to present enhanced content associated with a media content instance. For example, interactive portal facility 106 may be configured to dynamically transition (e.g., in response to a request detected by detection facility 104) from a presentation of a media content instance on a display screen to a presentation of an interactive portal on a display screen. In some examples, the interactive portal may be configured to include both a continued presentation of the media content instance (e.g., embedded within the portal) and enhanced content related to the media content instance.

Interactive portal facility 106 may be further configured to manage (e.g., generate, select, present, update, etc.) enhanced content. For example, interactive portal facility 106 may be configured to present, within an interactive portal, enhanced content that is related to and temporally synchronized with a media content instance that is also being presented within the interactive portal.

Interactive portal facility 106 may be configured to select the enhanced content that is presented by way of the interactive portal in any suitable manner as may serve a particular implementation. For example, interactive portal facility 106 may select and associate at least a portion of the enhanced content with the media content instance before the media content instance is presented. To illustrate, interactive portal facility 106 may be implemented by one or more computing devices associated with a service provider and/or a media content provider and may determine a relationship between enhanced content and a media content instance (e.g., a temporal relationship between various instances of enhanced content and various portions of a media content instance) before the media content instance is broadcast or otherwise presented. The related enhanced content may then be streamed (or otherwise transmitted) concurrently with a streaming (or other type of transmission) of the media content instance. A media content access device may receive both streams and selectively display the enhanced content stream in response to a user interaction with the media content instance.

Additionally or alternatively, interactive portal facility 106 may dynamically select at least a portion of the enhanced content during the presentation of the media content instance. For example, the media content instance may include a live broadcast of an event. Because the event is broadcast live, it may be infeasible to select and associate enhanced content with the live broadcast before the event takes place. In this situation, interactive portal facility 106 may dynamically select the enhanced content as the event transpires.

Interactive portal facility 106 may dynamically select enhanced content to be related to a media content instance as the media content instance is presented in any suitable manner. For example, as will be illustrated below, interactive portal facility 106 may base a dynamic selection of enhanced content on metadata associated with the media content instance, user profile information associated with one or more users, equipment information associated with a media content access device through which the media content instance is presented, and/or social media activity associated with one or more users.

Interactive portal facility 106 may be further configured to temporally synchronize enhanced data with a media content instance. In other words, different instances of enhanced content may be related to different portions of a media content instance (e.g., different segments, frames, chapters, etc. of a media content instance) in a manner that facilitates concurrent presentation of related portions of the enhanced content and the media content instance. In some examples, enhanced content related to a particular portion of a media content instance may be associated with one or more unique characteristics of the particular portion (e.g., associated with people appearing in the particular portion, objects appearing in the particular portion, things happening in the particular portion, a setting of the particular portion, what is being said in the particular portion, etc.).

In some examples, at least a portion of the enhanced content provided by interactive portal facility 106 may be interactive in that a user may select the enhanced content in order to access additional enhanced content related to the selected enhanced content and/or the media content instance. To illustrate, enhanced content in the form of advertisement content may be configured to allow a user to browse, research, and/or purchase advertised products in response to user interaction with the advertisement content. Enhanced content in the form of metadata content may be configured to allow a user to selectively browse through and navigate metadata information (e.g., statistical content associated with a sporting event) associated with a media content instance in response to user interaction with the metadata content. Enhanced content in the form of social media content may be configured to allow a user to generate social media communications (e.g., comments, posts, tweets, etc.), indicate that the user "likes" a media content instance being presented, participate in one or more group chats with other users (e.g., by way of an Extensible Messaging and Presence Protocol based multi-user chat, by way of Google Talk, etc.), browse a list of social media contacts and/or other users that are viewing the same media content instance, browse social media content associated with one or more users, participate in one or more games, submit one or more responses (e.g., votes, answers to survey questions, etc.) in response to an inquiry provided by way of a media content instance (e.g., a reality television program, a news program, etc.), make one or more monetary donations in accordance with a presentation of a media content instance (e.g., a television program or advertisement for a charitable cause), and/or perform any other activity related to the social media content in response to user interaction with the social media content.

In some examples, interactive portal facility 106 may be configured to dynamically modify an interactive portal and/or enhanced content included in the interactive portal in response to one or more events. For example, interactive portal facility 106 may dynamically modify the contents of an interactive portal in response to a presentation transition from one media content instance to another media content instance (e.g., to include enhanced related to the another media content instance in the interactive portal), an interaction by a user with enhanced content included in the interactive portal (e.g., to include additional enhanced content related to the enhanced content that the user interacted with), and/or in response to any other suitable event and/or information, as will be explained in more detail below.

Storage facility 108 may be configured to maintain media content data 110 representative of one or more media content instances, enhanced content data 112 representative of enhanced content, and user profile data 114 representative of user profile information associated with one or more users. As used herein, the term "user profile information" may refer to any suitable data and/or information associated with a user. For example, a user profile may include a set of data representing information associated with a user's personal traits, preferences, settings, age, gender, income level, profession, family status, nationality, preferred genre of media content, media content viewing tendencies, social media contacts (e.g., Facebook friends, Twitter followers, etc.), account, subscription to media content services, and/or any other suitable information associated with the user. Storage facility 108 may be configured to maintain additional or alternative data as may serve a particular implementation.

Figure 2:
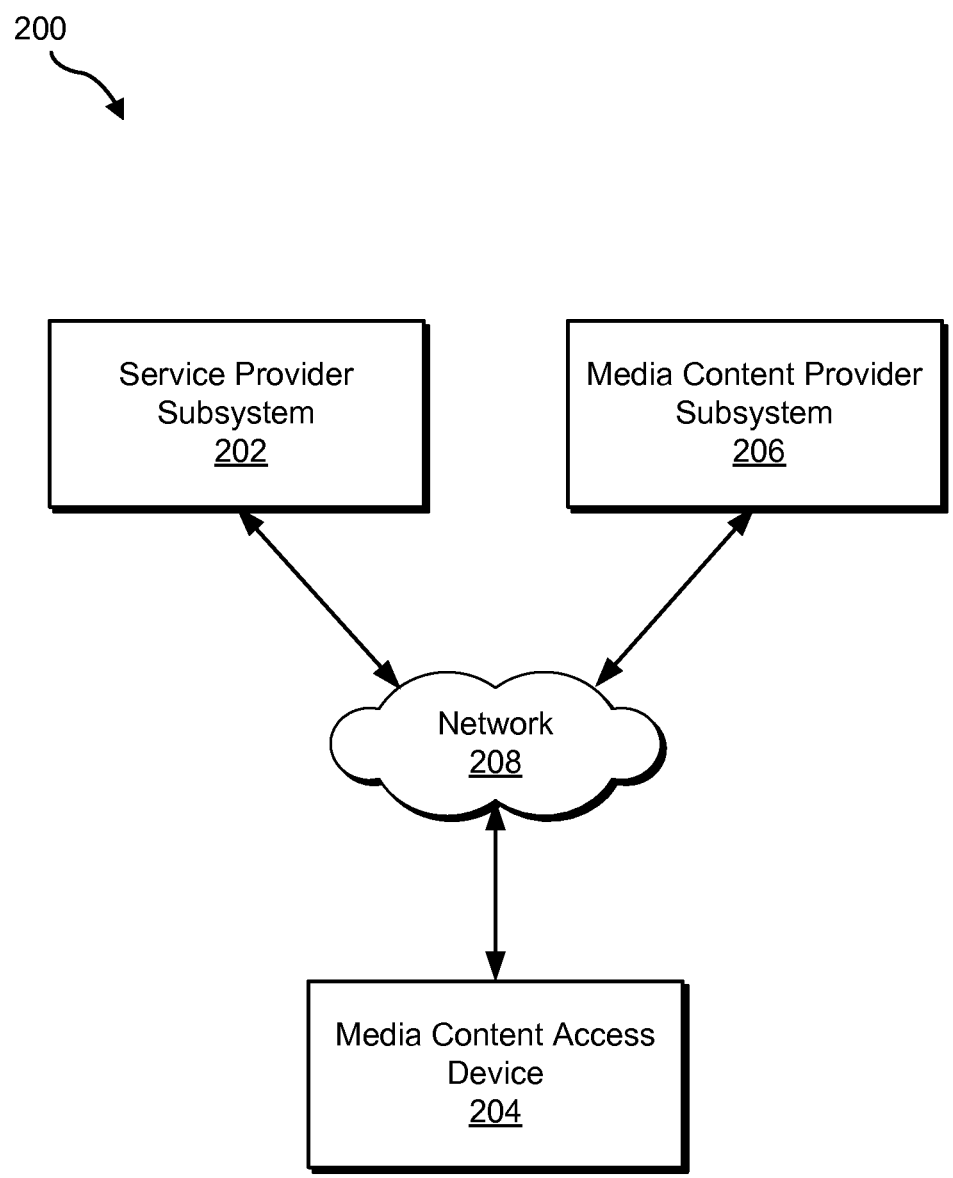
FIG. 2 illustrates an exemplary implementation of the system of FIG. 1 according to principles described herein.

FIG. 2 illustrates an exemplary implementation 200 of system 100 wherein a service provider subsystem 202 is communicatively coupled to a media content access device 204 (or simply "access device 204") and a media content provider subsystem 206 by way of a network 208. As will be described in more detail below, presentation facility 102, detection facility 104, interactive portal facility 106, and storage facility 108 may each be implemented on one or more of service provider subsystem 202, access device 204, and media content provider subsystem 206.

Service provider subsystem 202 may be associated with a service provider (e.g., a subscriber television service provider, an internet service provider, etc.) and may be configured to provide one or more media content services (e.g., television services, video-on-demand services, Internet services, etc.) to access device 204. For example, service provider subsystem 202 may be configured to manage (e.g., maintain, process, distribute, and/or generate) media content (e.g., media content programs, advertisements, etc.) configured to be presented to one or more users of access device 204. In some examples, media content provided by service provider subsystem 202 may be associated with and/or received from media content provider subsystem 206, which may be associated with any suitable media content provider (e.g., ESPN, etc.).

In some examples, service provider subsystem 202 may be configured to facilitate submission of enhanced and/or other content by media content provider subsystem 206 for inclusion in an interactive portal. For example, service provider subsystem 202 may provide data representative of one or more specifications, templates, and/or schemas associated with an interactive portal to media content provider subsystem 206. The one or more specifications, templates, and/or schemas may be configured to indicate the types, formats, and/or sizes of enhanced content that may be submitted to service provider subsystem 202 for inclusion in an interactive portal. A user associated with media content provider subsystem 206 may then provide content to service provider subsystem 206 in accordance with the one or more specifications, templates, and/or schemas. The enhanced content may be provided by media content provider subsystem 206 to service provider subsystem 202 in any suitable manner. For example, media content provider subsystem 206 may transmit data representative of the enhanced content and/or updates to the enhanced content to service provider subsystem 202 by way of a web upload (e.g., via a web page managed and/or provided by service provider subsystem 202), a web feed, a file (e.g., a Zip file), and/or in any other suitable manner. In some examples, media content provider subsystem 206 may additionally or alternatively provide data representative of information regarding what media content instance(s) and/or portions thereof the enhanced content is related to, when the enhanced content should be presented, a targeted audience associated with the enhanced content, and/or any other suitable information configured to facilitate proper and effective presentation of the enhanced content to users.

Access device 204 may be configured to facilitate access by a user to media content instances, interactive portals, enhanced content, and/or other content provided by service provider subsystem 202 and/or media content provider subsystem 206. Access device 204 may be implemented by any suitable media content access device, such as a set-top box device, a digital video recorder ("DVR") device, a mobile device phone device, a tablet computer, a personal-digital assistant device, a gaming device, a television device, and/or any other suitable media content access device.

Service provider subsystem 202, access device 204, and/or media content provider subsystem 206 may each be implemented by one or more computing devices. For example, service provider subsystem 202, access device 204, and/or media content provider subsystem 206 may be implemented by one or more server devices, access devices, and/or other computing devices.

Service provider subsystem 202, access device 204, and/or media content provider subsystem 206 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Service provider subsystem 202, access device 204, and/or media content provider subsystem 206 may communicate using any suitable network. For example, as shown in FIG. 2, service provider subsystem 202, access device 204, and/or media content provider subsystem 206 may be configured to communicate with each other over network 208. Network 208 may include one or more networks or types of networks capable of carrying communications and/or data signals between the components of system 100. For example, network 208 may include, but are not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In some examples, although FIG. 2 shows service provider subsystem 202, access device 204, and media content provider subsystem 206 communicatively coupled via network 208, it will be recognized that the service provider subsystem 202, access device 204, and/or media content provider subsystem 206 may be configured to communicate one with another in any other suitable manner (e.g., via a direct connection).

In certain embodiments, system 100 may be implemented entirely by or within service provider subsystem 202, access device 204, or media content provider subsystem 206. For example, system 100 may be implemented entirely by service provider subsystem 202. In other embodiments, components of system 100 may be distributed across service provider subsystem 202, access device 204, and/or media content provider subsystem 206.

Figure 3:
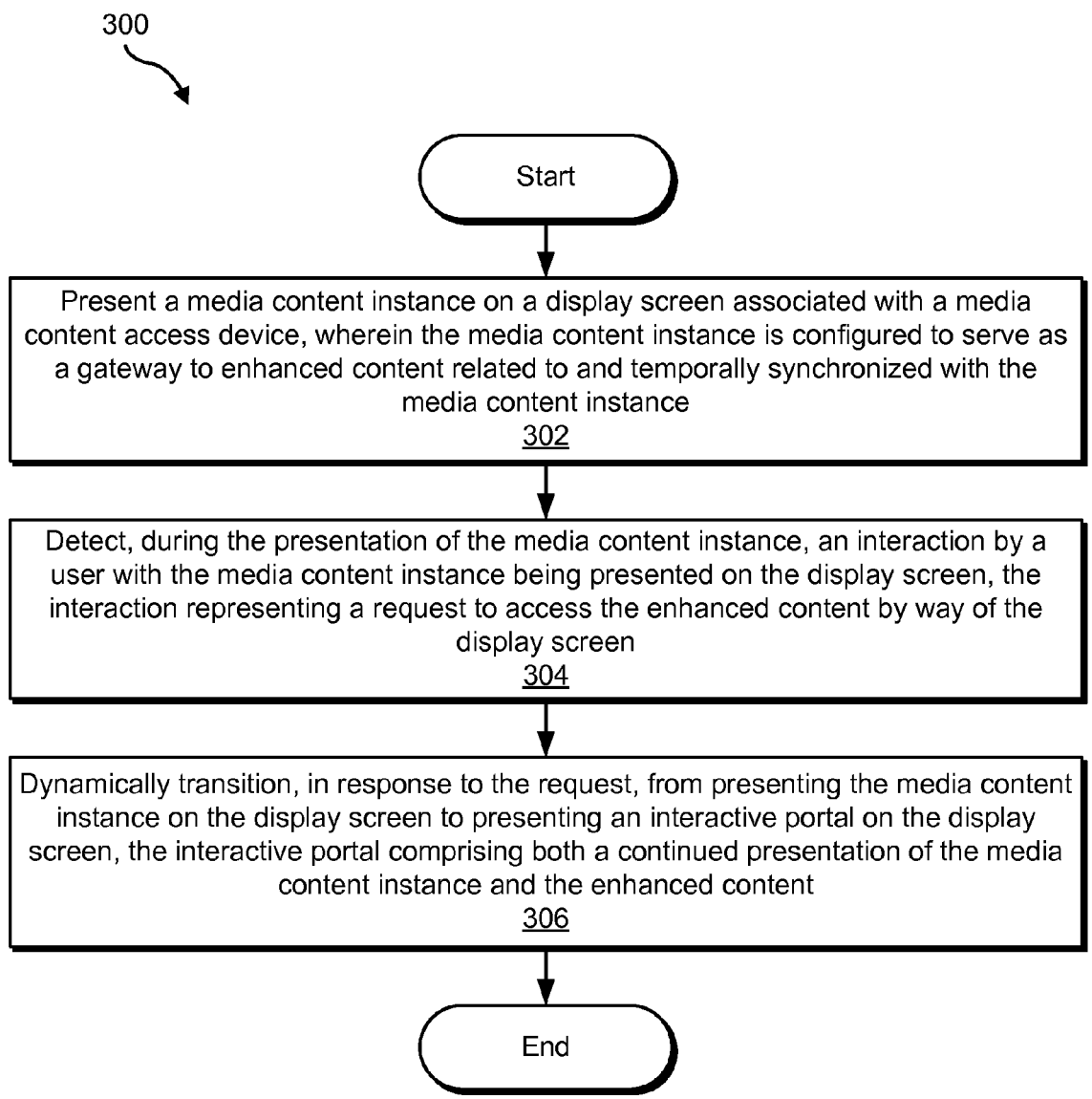
FIG. 3 illustrates an exemplary interactive media content presentation method according to principles described herein.
Figure 4:
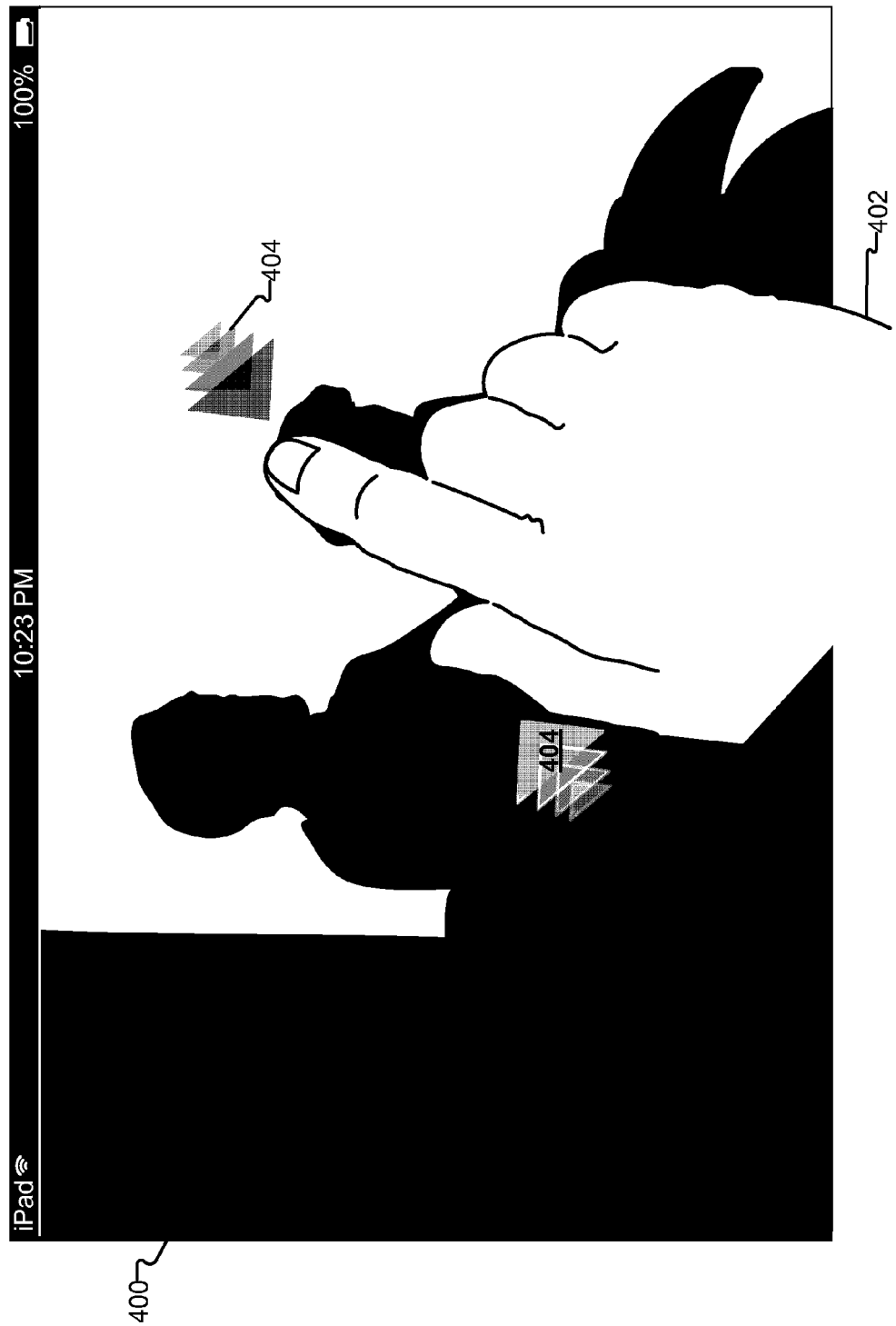
FIGS. 4-10 illustrate exemplary views of interactive media content presentations according to principles described herein.

FIG. 3 illustrates an exemplary interactive media content presentation method 300 according to principles described herein. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of system 100.

In step 302, an interactive media content presentation system presents a media content instance on a display screen associated with a media content access device. For example, presentation facility 102 may present the media content instance in any suitable manner, such as disclosed herein. In some examples, the media content instance may be configured to serve as a gateway to enhanced content related to and temporally synchronized with the media content instance.

In step 304, the interactive media content presentation system detects, during the presentation of the media content instance, an interaction by a user with the media content instance being presented on the display screen. For example, detection facility 104 may detect the interaction with the media content instance in any suitable manner, such as disclosed herein. As described above, the interaction represents a request to access the enhanced content by way of the display screen.

In step 306, the interactive media content presentation system dynamically transitions, in response to the request, from presenting the media content instance on the display screen to presenting an interactive portal on the display screen. For example, interactive portal facility 106 may present the interactive portal in any suitable manner, such as disclosed herein. In some examples, the interactive portal may include both a continued presentation of the media content instance and the enhanced content.

To illustrate the foregoing, FIGS. 4-10 illustrate exemplary views of interactive media content presentations according to principles described herein. It will be recognized that the exemplary views shown in FIGS. 4-10 are merely illustrative and that they may be modified, redacted, or added to in any way as may serve a particular implementation.

As mentioned above, presentation facility 102 may be configured to present a media content instance on a display screen associated with a media content access device. To illustrate, FIG. 4 includes an exemplary presentation of a media content instance 400 (e.g., a television program entitled "Boardwalk Empire") by way of a display screen (e.g., a touch screen) associated with a media content access device (e.g., a tablet computer) used by a user 402. In some examples, media content instance 400 may be configured to serve as a gateway to enhanced content related to media content instance 400 and/or temporally synchronized with media content instance 400.

To illustrate, a media content provider (e.g., HBO) associated with media content instance 400 may provide enhanced content related to media content instance 400 for presentation in conjunction with media content instance 400. For example, the media content provider may provide metadata content (e.g., episode information, description information, cast information, etc.), advertisement content (e.g., banner ads, interactive ads, etc.), and/or social media content (e.g., a Facebook page associated with media content instance 400) related to media content instance 400. The enhanced content may be accompanied by data representative of instructions specifying a presentation order and/or presentation schedule of the enhanced content during a presentation of media content instance 400. In additional or alternative examples, interactive portal facility 106 may dynamically select enhanced content for presentation in conjunction with media content instance 400 based on any suitable information associated with media content instance 400 and/or user 402, such as disclosed herein.

To request access to enhanced content related to media content instance 400, a user may interact with media content instance 400 by touching the display screen, pressing a button, or performing any other suitable action with respect to media content instance 400 during a presentation of media content instance 400. For example, as illustrated by arrows 404 shown in FIG. 4, user 402 may perform a pinch touch gesture on the display screen during the presentation of media content instance 400.

Figure 5:
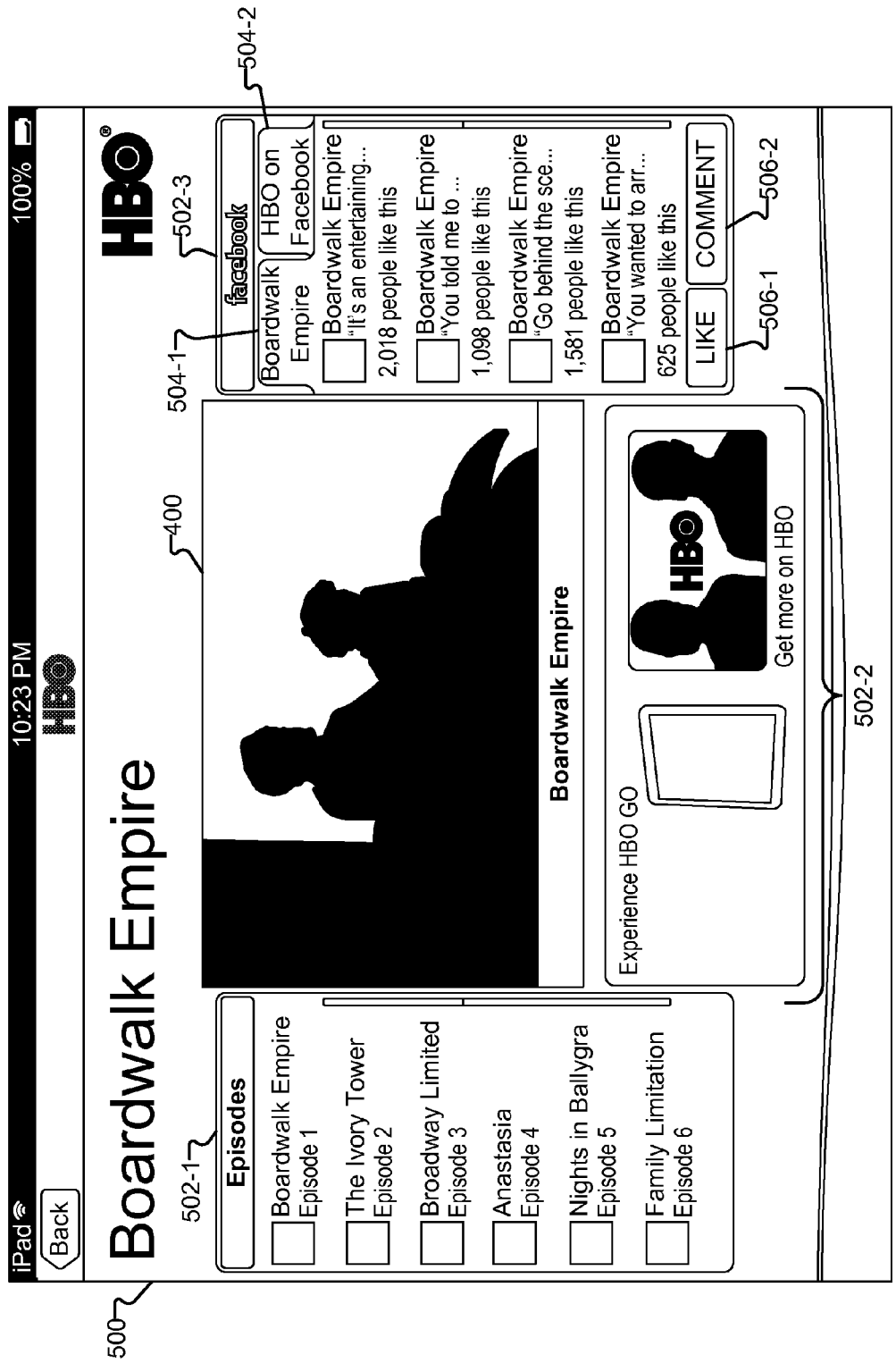

In response, interactive portal facility 106 may dynamically transition from a presentation of media content instance 400 to a presentation of an interactive portal. To illustrate, FIG. 5 shows an interactive portal 500 that may be presented in response to the pinch touch gesture performed by user 402. As shown, interactive portal 500 may include a continued presentation of media content instance 400 (e.g., by way of a window embedded within interactive portal 500) as well as enhanced content 502 (e.g., metadata content 502-1, advertisement content 502-2, and social media content 502-3). In some examples, as user 402 performs the pinch touch gesture, interactive portal facility 106 may dynamically increase an amount of enhanced content 502 included in interactive portal 500 (e.g., dynamically "bring in" additional instances of enhanced content 502 from a perimeter of interactive portal 500), thereby allowing user 402 to control the amount of enhanced content 502 and/or a size of the continued presentation of media content instance 400.

Enhanced content 502 may be positioned within interactive portal 500 in any suitable arrangement as may serve a particular implementation. For example, metadata content 502-1 may positioned to the left of media content instance 400, advertisement content 502-2 may be positioned below media content instance 400, and social media content 502-3 may be positioned to the right of media content instance 400. Metadata content 502-1, advertisement content 502-2, and social media content 502-3 may each include one or more enhanced content instances as may serve a particular implementation.

To illustrate, as shown in FIG. 5, metadata content 502-1 may include a list of episodes and corresponding information related to media content instance 400. In some examples, a user may scroll through and/or select one or more episodes to access additional information associated with the one or more episodes. Metadata content 502-1 may additionally or alternatively include any other metadata content instance as may serve a particular implementation.

Advertisement content 502-2 may include one or more advertisements (e.g., banner advertisements, expanding advertisements, floating advertisements, pop-up advertisements, etc.) for media content instance 400, a media content provider associated media content instance 400, a vendor associated with media content instance 400 (e.g., by way of a sponsorship agreement), a product associated with media content instance 400 (e.g., a product portrayed within media content instance 400), another media content instance, and/or any other suitable advertisement.

Social media content 502-3 may include any type of social media content related to media content instance 400, one or more users (e.g., user 402 and/or one or more friends of user 402), a service provider, and/or a media content provider. To illustrate, social media content 502-3 may include multiple selectable tabs 504-1 and 504-2 (collectively referred to herein as "selectable tabs 504") associated with respective groupings of social media content. For example, each of selectable tabs 504 may be associated with a particular Facebook page, a Twitter feed, and/or any other social media content. Accordingly, a user (e.g., user 402) may utilize selectable tabs 504 to selectively navigate through social media content related to media content instance 400. Additionally or alternatively, social media content 502-3 may include one or more selectable options 506 (e.g., selectable options 506-1 and 506-2) configured to allow the user to indicate that the user "likes" something related to media content instance 400, post a comment to a particular social media page, and/or perform any other type of social media activity.

In some examples, social media content 502-3 may be associated with a unique group of users. For example, interactive portal facility 106 may be configured to dynamically identify a group of users (e.g., a group of users each watching a particular television program), aggregate social media content associated with the group of users, and present the aggregated social media content within interactive portal 500. In some examples, the unique group of users may be based on connections between social media contacts (e.g., Facebook friends), which users are currently viewing media content instance 400, user profile information associated with the users (e.g., to group users with similar interests), and/or any other suitable information connecting users together in any other suitable manner. Accordingly, interactive portal facility 106 may facilitate "swarming" of like-minded users around media content instance 400.

Interactive portal 500 may include any other type of content as may serve a particular implementation. For example, interactive portal 500 may include a logo related to media content instance 400, a logo associated with a related media content provider (e.g., HBO), a logo associated with a related service provider (e.g., a subscriber television service provider), a unique background or wallpaper related to media content instance 400, a unique color scheme related to media content instance 400, and/or any other suitable graphical content related to media content instance 400 and/or a corresponding service provider and/or media content provider. Accordingly, interactive portal 500 may portray a unique look and feel related to media content instance 400, a service provider, a media content provider, a user, and/or any other entity.

In some examples, enhanced content 502 may be configured to be interactive in one or more ways. For example, enhanced content 502 may include one or more selectable tabs, scroll bars, form-fillable fields, and/or selectable options configured to allow user 402 to navigate, browse, select, and/or otherwise interact with enhanced content 502 in any suitable manner.

In some examples, user 402 may decide that he or she would like to return to viewing media content instance 400 in full-screen. To this end, user 402 may perform a suitable command (e.g., a reverse-pinch touch gesture) to request to discontinue accessing the enhanced content related to media content instance 400. In response, interactive portal facility 106 may dynamically transition from presenting interactive portal 500 to only presenting media content instance 400 on the display screen. In some examples, as user 402 performs the command (e.g., the reverse-pinch touch gesture), interactive portal facility 106 may dynamically decrease an amount of enhanced content 702 included in interactive portal 500 until interactive portal 500 is entirely closed or hidden.

Figure 6:

FIG. 6 illustrates a presentation of another media content instance 600 (e.g., a television program entitled "Whale Wars") by way of a display screen (e.g., a display screen of a television device) associated with a media content device (e.g., a set-top box device). As shown, in some examples, interactive portal facility 106 may be configured to present, in conjunction with media content instance 600, a notification message 602 configured to notify a user that an interactive portal related to media content instance 600 is available. For example, as shown in FIG. 6, notification message 602 may direct the user to "Press 'OK' to Go Interactive!"

Figure 7:
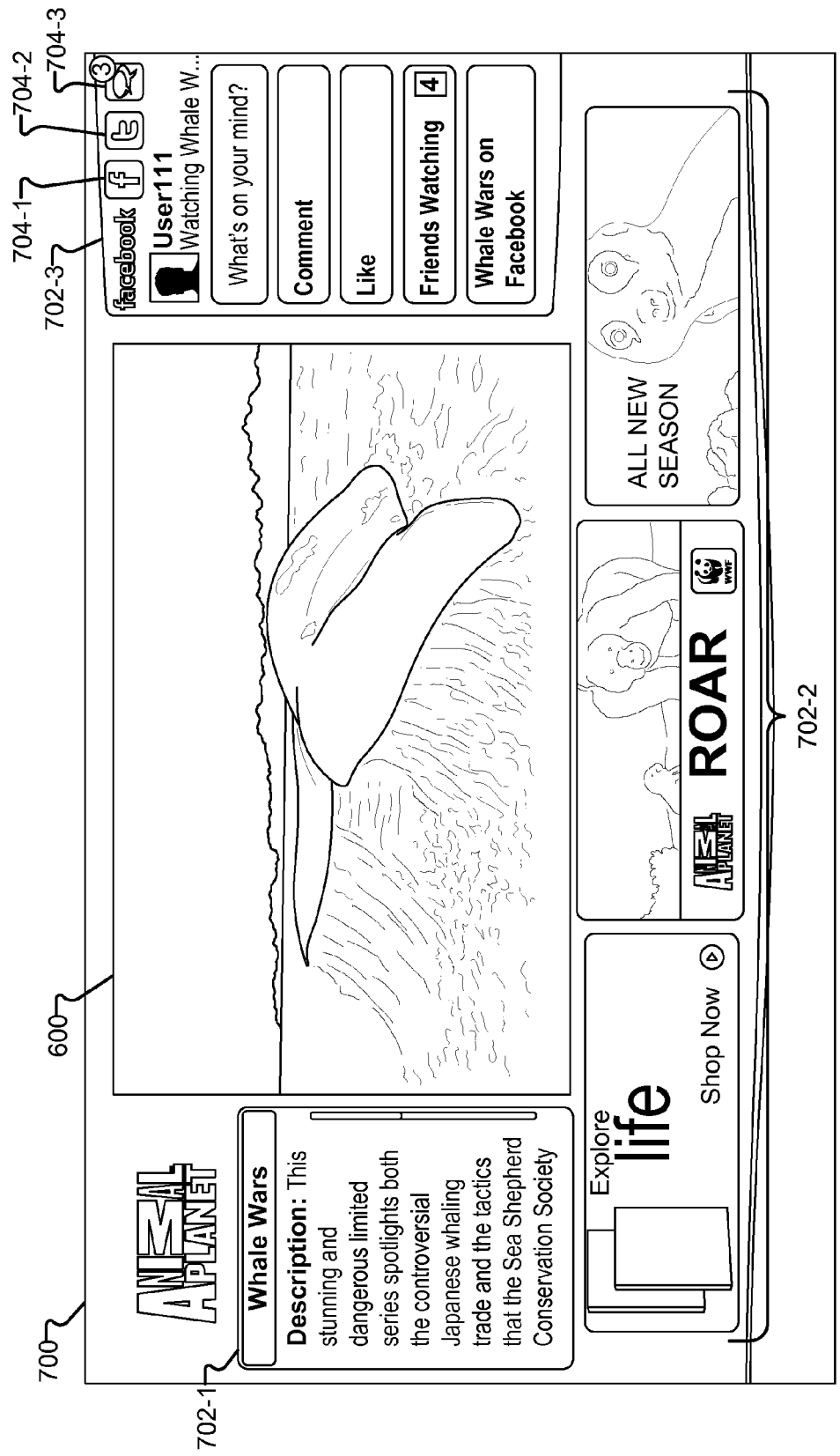

FIG. 7 shows that in response to the user performing the command specified in notification message 602, interactive portal facility 106 may dynamically transition from a presentation of media content instance 600 to a presentation of an interactive portal 700. As shown, interactive portal 700 may include both a continued presentation of media content instance 600 and enhanced content 702 (e.g., metadata content 702-1, advertisement content 702-2, and social media content 702-3). Enhanced content 702 may be positioned within interactive portal 700 in any suitable manner and may provide the user with one or more interactive content experiences as may serve a particular implementation.

Figure 8:
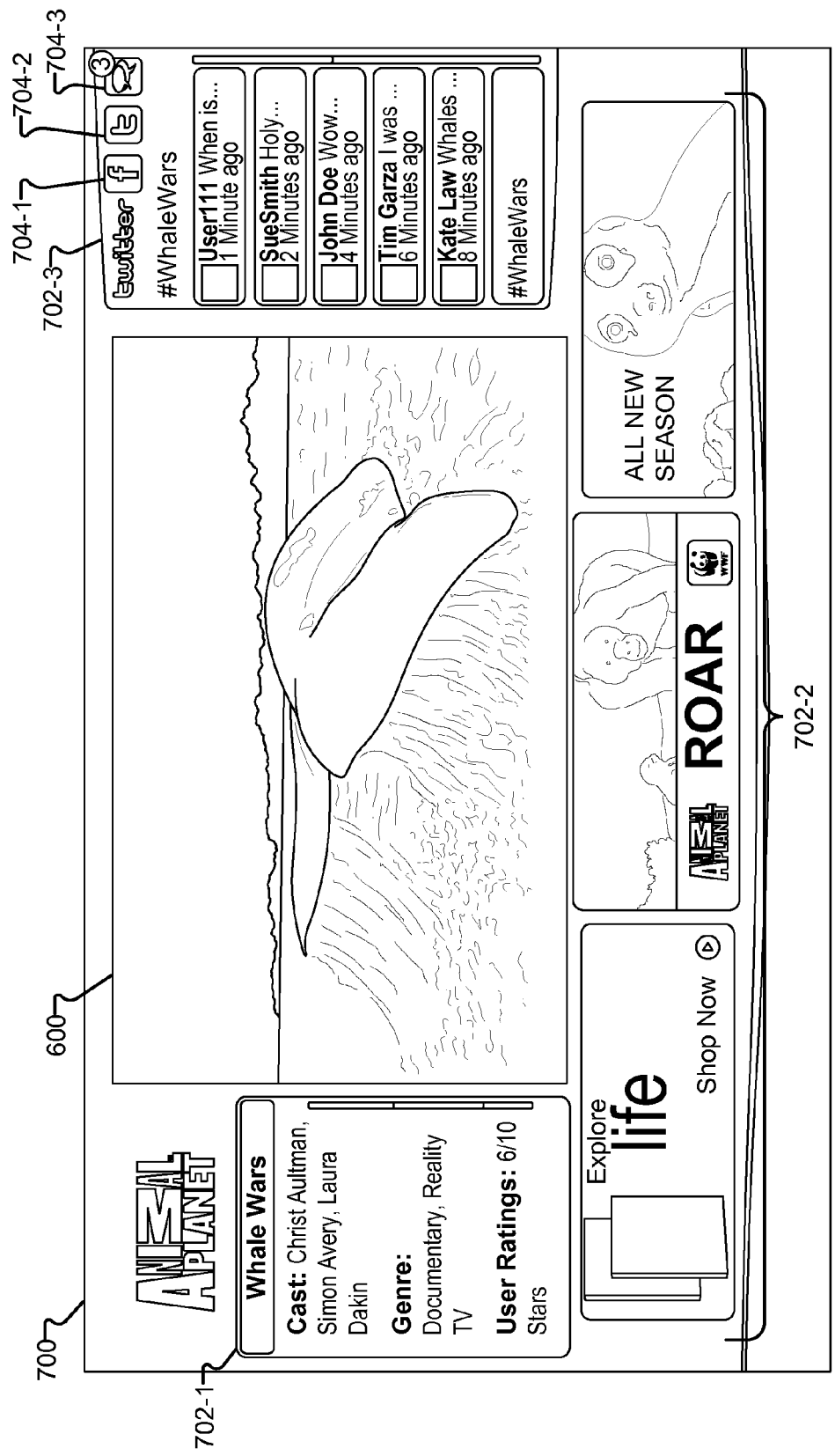
Figure 9:
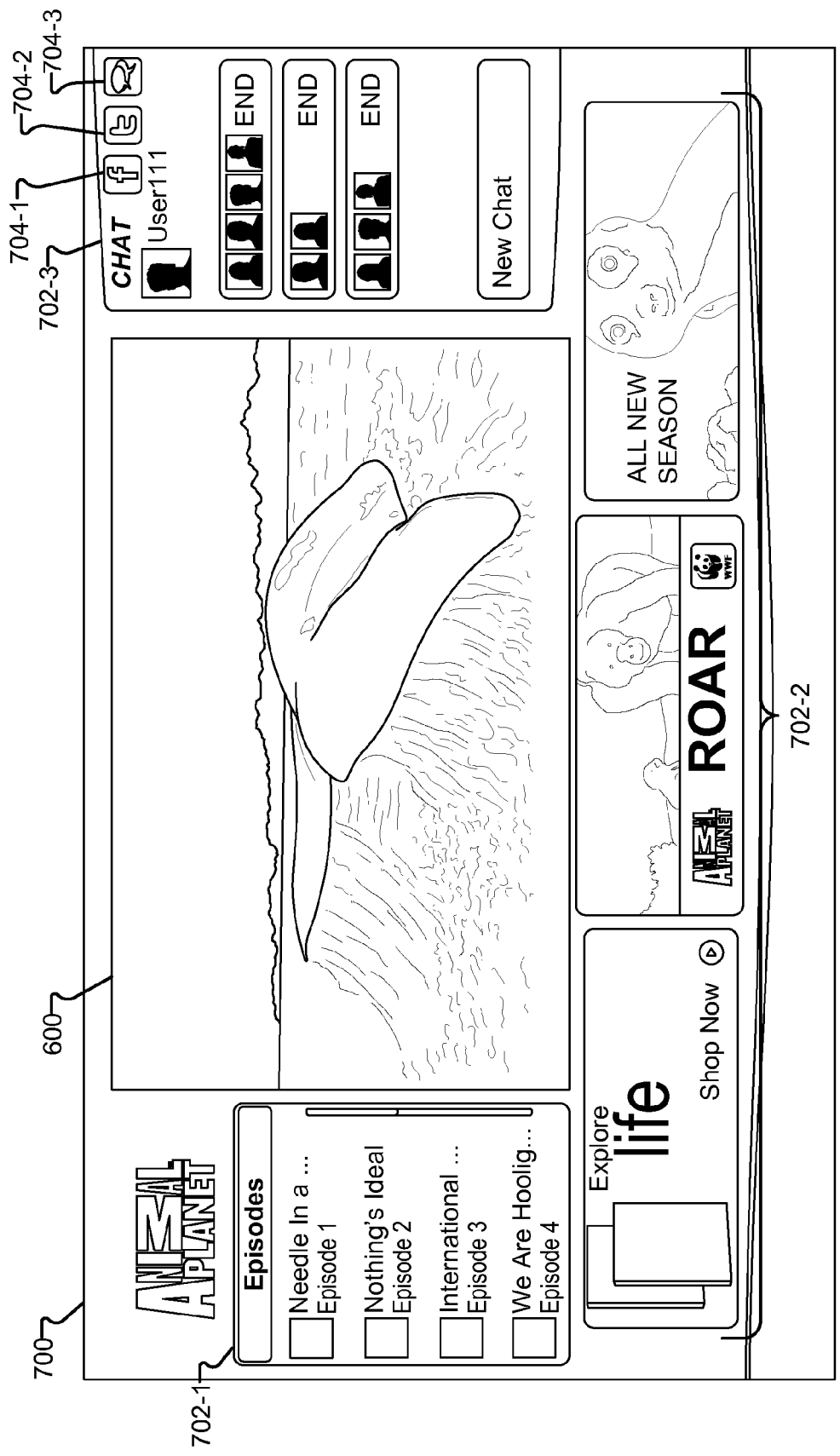

To illustrate, social media content 702-3 may include selectable options 704-1 through 704-3 (collectively referred to herein as "selectable options 704"), each associated with and/or configured to allow the user to access social media content associated with a different social media outlet. To illustrate, selectable option 704-1 may be associated with and/or configured to allow the user to access social media content associated with Facebook, as shown in FIG. 7. In additional or alternative examples, selectable option 704-2 may be associated with and/or configured to allow the user to access social media content associated with Twitter, as shown in FIG. 8. In additional or alternative examples, selectable option 704-3 may be associated with and/or configured to allow the user to access one or more group chat functions and/or participate in one or more group chats, as shown in FIG. 9.

As mentioned, the contents of an interactive portal (e.g., interactive portal 700) may be dynamically changed, added to, or otherwise modified in response to a user's interactions with enhanced content included within the interactive portal. To illustrate, in response to a selection by a user of a particular advertisement included in advertisement content 702-2, interactive portal facility 106 may dynamically modify interactive portal 700 to include additional enhanced content related to the particular advertisement, dynamically modify the look and/or feel of interactive portal 700 (e.g., modify a logo, background attribute, and/or any other content included in interactive portal 700), and/or dynamically modify interactive portal 700 in any other suitable manner.

As also mentioned, the contents of an interactive portal (e.g., interactive portal 700) may be dynamically changed, added to, or otherwise modified in response to a presentation transition from one media content instance another media content instance. For example, the contents of an interactive portal may be dynamically modified in response to a transition between a television program and an advertisement break, a change in channels (e.g., that occurs in response to a user request to tune from a first media programming channel to a second media programming channel), a transition from live content to recorded content, etc.

Figure 10:
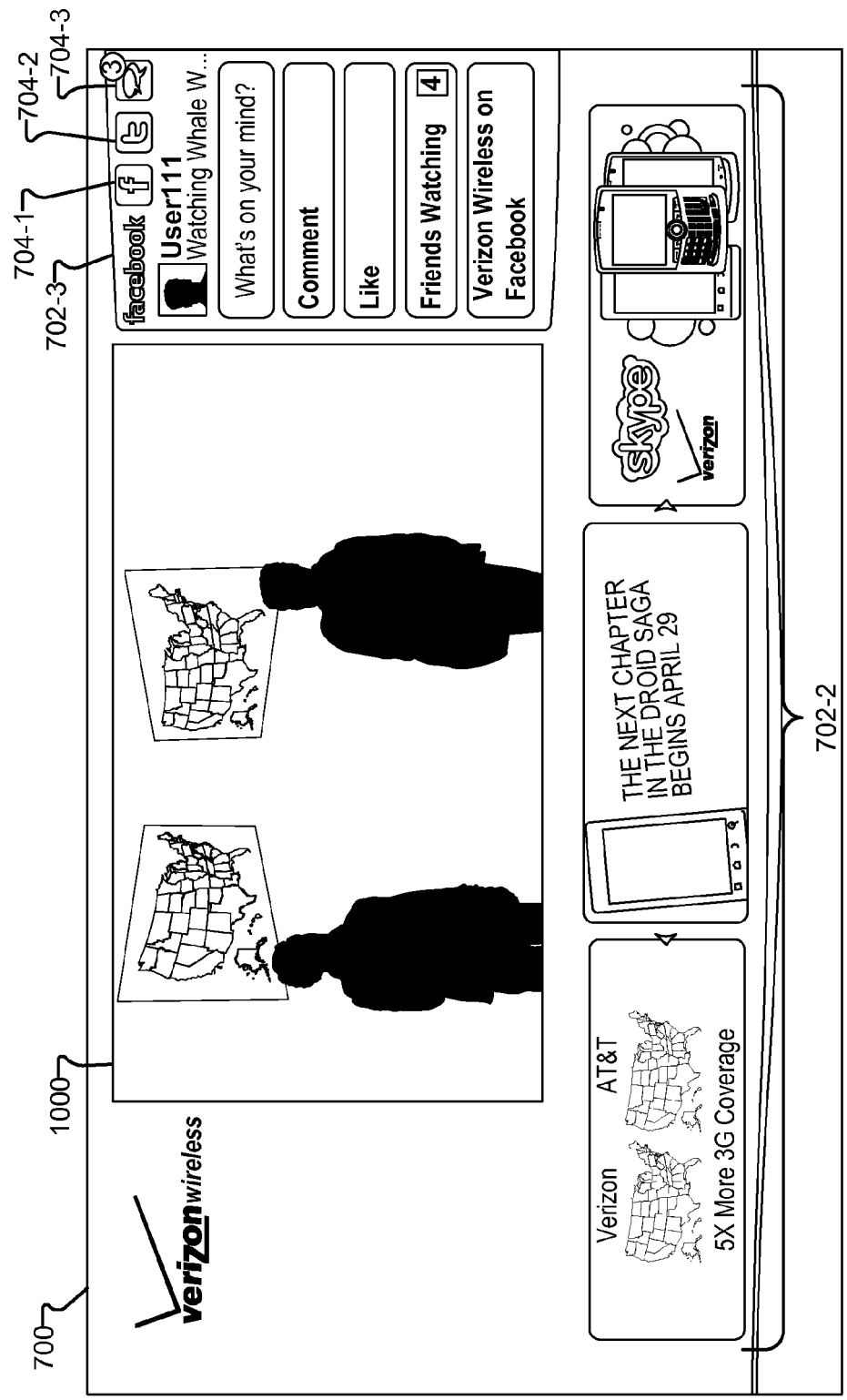

To illustrate, FIG. 10 shows that system 100 may transition from presenting media content instance 600 within interactive portal 700 to presenting an advertisement 1000 (e.g., an advertisement for "Verizon Wireless") during an advertisement break associated with media content instance 600. As shown in FIG. 10, in response to the transition to advertisement 1000, interactive portal facility 106 may dynamically modify interactive portal 700 from the view shown in FIG. 7 to the view shown in FIG. 10. As shown, interactive portal facility 106 may dynamically modify enhanced content 702 and/or other graphical content included in interactive portal 700. For example, as shown in FIG. 10, in response to the transition to advertisement 1000, interactive portal facility 106 may dynamically remove metadata content 702-1, dynamically modify advertisement content 702-2 to include advertisement content related to advertisement 1000, dynamically modify social media content 702-3 to include social media content related to advertisement 1000, dynamically modify interactive portal 700 to include a logo and/or wallpaper related to advertisement 1000, and/or dynamically modify interactive portal 700 in any other suitable manner.

Alternatively, the enhanced content related to media content instance 600 persists within interactive portal 700 even when system 100 transitions from presenting media content instance 600 to presenting advertisement 1000. In this manner, the user may interact with the enhanced content related to media content instance 600 during advertisement breaks.

Figure 11:
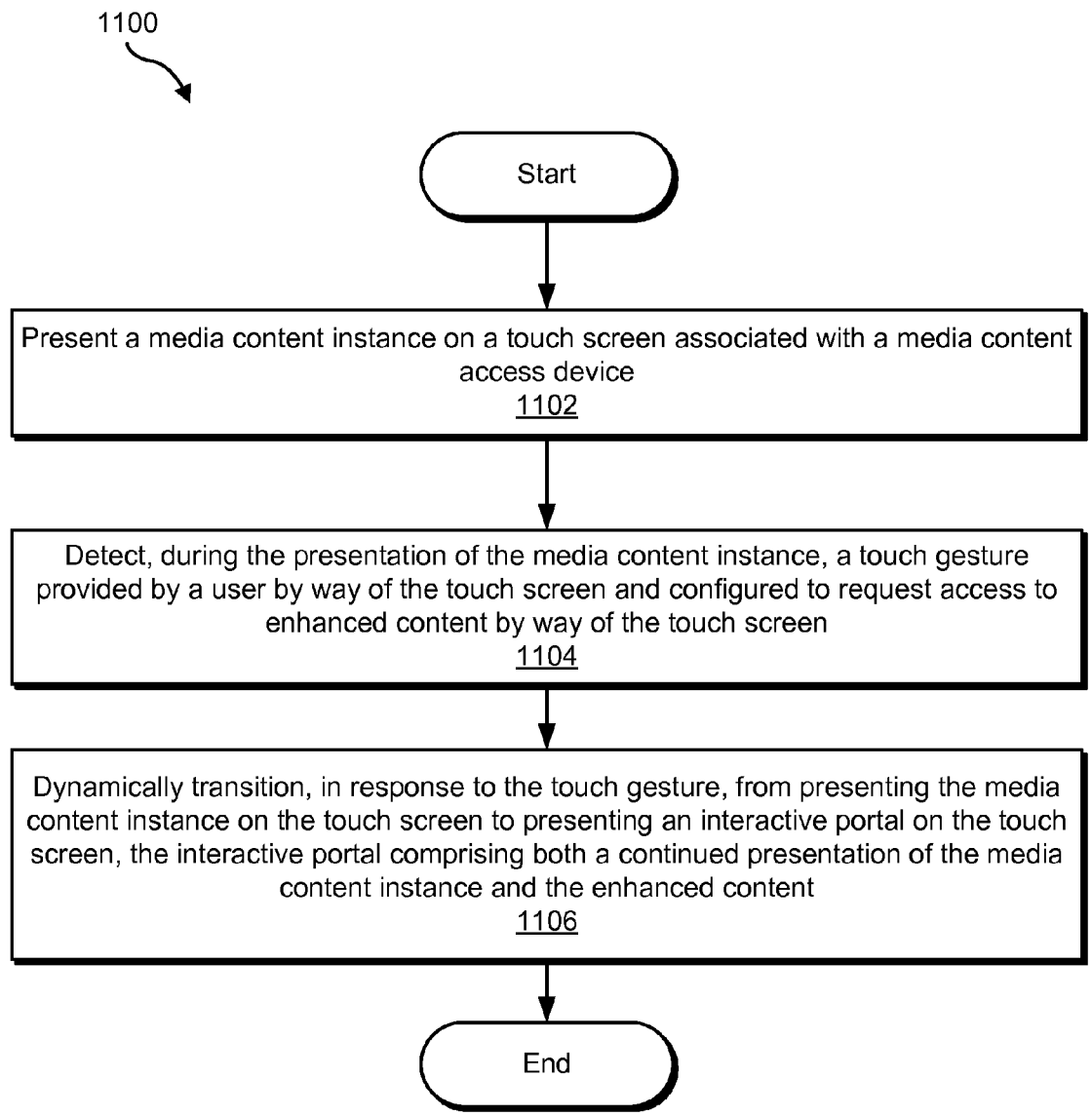
FIG. 11 illustrates another exemplary interactive media content presentation method according to principles described herein.

FIG. 11 illustrates another exemplary interactive media content presentation method 1100 according to principles described herein. While FIG. 11 illustrates exemplary steps according to one embodiment, other embodiments may omit, add to, reorder, and/or modify any of the steps shown in FIG.

11. One or more of the steps shown in FIG. 11 may be performed by any component or combination of components of system 100.

In step 1102, an interactive media content presentation system presents a media content instance on a touch screen associated with a media content access device. For example, presentation facility 102 may present the media content instance on the touch screen in any suitable manner, such as disclosed herein.

In step 1104, the interactive media content presentation system detects, during the presentation of the media content instance, a touch gesture provided by a user by way of the touch screen and configured to request access to enhanced content by way of the touch screen. For example, detection facility 104 may detect the touch gesture in any suitable manner, such as disclosed herein.

In step 1106, the interactive media content presentation system dynamically transitions, in response to the touch gesture, from presenting the media touch instance on the touch screen to presenting an interactive portal on the display screen. The interactive portal may include both a continued presentation of the media content instance and the enhanced content and may be presented in any suitable manner, such as disclosed herein. In some examples, the enhanced content may be related to and temporally synchronized with the continued presentation of the media content instance.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
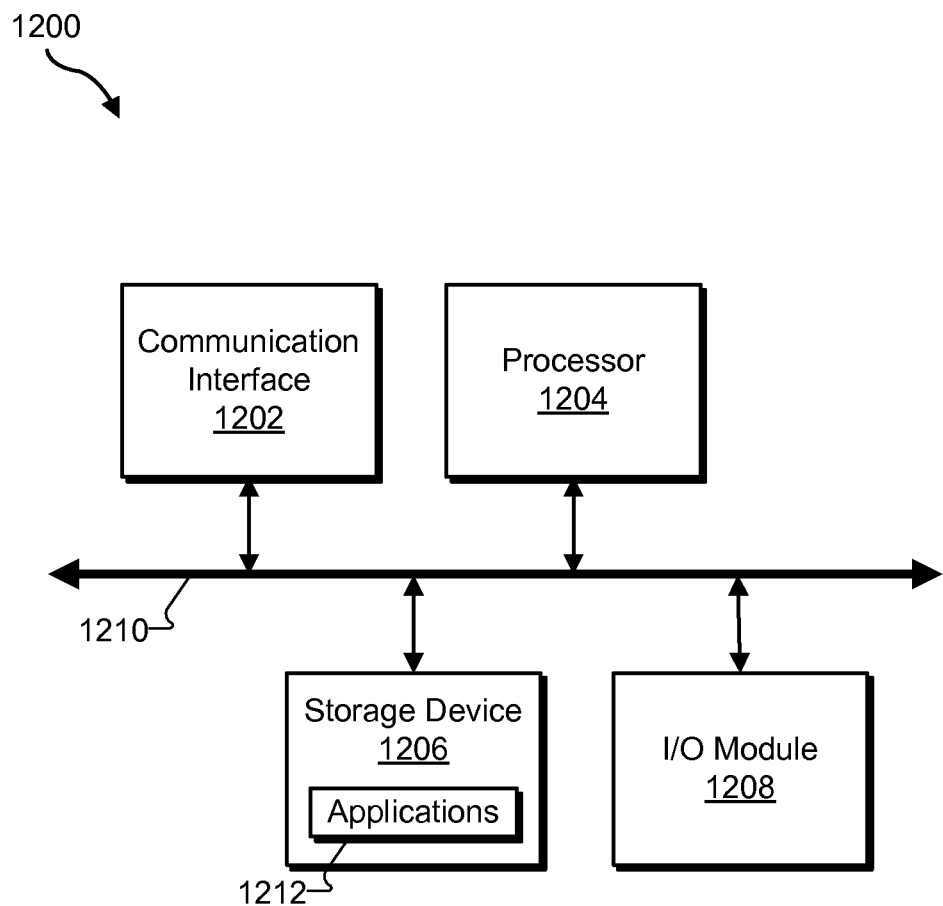
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with presentation facility 102, detection facility 104, and/or interactive portal facility 106. Likewise, storage facility 108 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
presenting, by an interactive media content presentation system, a first media content instance on a display screen associated with a media content access device, wherein the first media content instance is configured to serve as a gateway to first enhanced content related to and temporally synchronized with the first media content instance;
detecting, by the interactive media content presentation system during the presentation of the first media content instance, a pinch touch gesture performed by a user with the first media content instance being presented on the display screen, the pinch touch gesture representing a request to access the first enhanced content by way of the display screen;
dynamically transitioning, by the interactive media content presentation system in response to the request, from presenting the first media content instance on the display screen to presenting an interactive portal on the display screen, the interactive portal comprising both a continued presentation of the first media content instance and the first enhanced content; and
dynamically updating, by the interactive media content presentation system, the first enhanced content presented within the interactive portal as the first media content instance transpires;
dynamically transitioning, by the interactive media content presentation system, from the first media content instance to a second media content instance configured to serve as a gateway to second enhanced content related to and temporally synchronized with the second media content instance;
dynamically modifying, by the interactive content presentation system in response to the dynamically transitioning from the first media content instance to the second media content instance, the interactive portal to include the second enhanced content related to and temporally synchronized with the second media content instance.

2. The method of claim 1, wherein the second additional media content instance comprises an advertisement presented during an advertisement break associated with the first media content instance.

3. The method of claim 1, wherein the first media content instance is carried by a first media programming channel and the second media content instance is carried by a second media programming channel, and the presentation of the second media content instance occurs is in response to a user request to tune to the second media programming channel.

4. The method of claim 1, wherein the first enhanced content comprises at least one of metadata content related to the first media content instance, advertisement content related to the first media content instance, and social media content related to the first media content instance.

5. The method of claim 4, wherein the social media content comprises at least one of social media activity related to the first media content instance and social media activity related to the user.

6. The method of claim 4, wherein at least one of the metadata content, the advertisement content, and the social media content is interactive.

7. The method of claim 1, wherein the first enhanced content comprises advertisement content related to the first media content instance, and wherein the method further comprises:
detecting, by the interactive media content presentation system, an interaction by the user with the advertisement content, the advertisement content being configured to serve as a gateway to second enhanced content related to the advertisement content; and
dynamically modifying, by the interactive media content presentation system in response to the interaction by the user with the advertisement content, the interactive portal to include the second enhanced content related to the advertisement content.

8. The method of claim 1, further comprising presenting, by the interactive media content presentation system during the presentation of the first media content instance, a notification message indicating the availability of the first enhanced content, wherein the pinch touch gesture representative of the request is performed in response to the notification message.

9. The method of claim 8, wherein the notification message and the first enhanced content are associated with advertisement content related to the first media content instance.

10. The method of claim 1, wherein the pinch touch gesture performed by the user is provided by way of a touch screen device.

11. The method of claim 1, wherein the dynamically transitioning comprises dynamically increasing an amount of enhanced content presented within the interactive portal as the user performs the pinch gesture.

12. The method of claim 1, further comprising:
detecting, by the interactive media content presentation system, an additional interaction by the user representing a request to discontinue accessing the first enhanced content; and
dynamically transitioning, by the interactive media content presentation system in response to the request to discontinue accessing the first enhanced content, from presenting the interactive portal on the display screen to presenting only the first media content instance on the display screen.

13. The method of claim 12, wherein:
the additional interaction by the user comprises a reverse-pinch touch gesture; and
the dynamically transitioning from presenting the interactive portal on the display screen to presenting only the first media content instance comprises dynamically decreasing an amount of enhanced content presented within the interactive portal as the user performs the reverse-pinch touch gesture.

14. The method of claim 1, further comprising selecting and associating, by the interactive media content presentation system, at least a portion of the first enhanced content with the first media content instance prior to presenting the first media content instance.

15. The method of claim 1, further comprising dynamically selecting, by the interactive media content presentation system during the presentation of the first media content instance, at least a portion of the first enhanced content.

16. The method of claim 15, wherein the dynamic selection is based on at least one of user profile information associated with the user, user profile information associated with a social media contact of the user, social media activity associated with the user, social media activity related to the first media content instance, and metadata related to the first media content instance.

17. The method of claim 1, wherein the media content access device comprises a set-top box device and the first media content instance is broadcast to the set-top box device by way of a broadcast television network.

18. The method of claim 1, wherein the interactive media content presentation system is at least partially implemented by a service provider subsystem associated with a television service provider.

19. The method of claim 1, further comprising facilitating, by the interactive media content presentation system, a submission of at least a portion of the first enhanced content by a media content provider associated with the first media content instance.

20. The method of claim 19, wherein the facilitating comprises providing at least one of specifications, a template, and a schema associated with the interactive portal to the media content provider.

21. The method of claim 1, embodied as computer-executable instructions on at least one non-transitory computer-readable medium.

22. A method comprising:
  presenting, by an interactive media content presentation system, a first media content instance on a touch screen associated with a media content access device;
  detecting, by the interactive media content presentation system during the presentation of the first media content instance, a touch gesture provided by a user by way of the touch screen and configured to request access to first enhanced content by way of the touch screen;
  dynamically transitioning, by the interactive media content presentation system in response to the touch gesture, from presenting the first media content instance on the touch screen to presenting an interactive portal on the touch screen, the interactive portal comprising both a continued presentation of the first media content instance and the first enhanced content; and
  dynamically updating, by the interactive media content presentation system, the first enhanced content presented within the interactive portal as the first media content instance transpires;
  dynamically transitioning, by the interactive media content presentation system, from the continued presentation of the first media content instance to a presentation of a second media content instance;
  dynamically modifying, by the interactive content presentation system in response to the dynamically transitioning from the first media content instance to the second media content instance, the interactive portal to include the presentation of the second media content instance and second enhanced content;
  wherein the first enhanced content is related to and temporally synchronized with the continued presentation of the first media content instance and the second enhanced content is related to and temporally synchronized with the presentation of the second media content instance.

23. A system comprising:
  a presentation facility configured to present a first media content instance on a display screen associated with a media content access device, wherein the first media content instance is configured to serve as a gateway to first enhanced content related to and temporally synchronized with the first media content instance;
  a detection facility communicatively coupled to the presentation facility and configured to detect, during the presentation of the first media content instance, a pinch touch gesture performed by a user, the pinch touch gesture representing a request to access the first enhanced content by way of the display screen; and
  an interactive portal facility communicatively coupled to the detection facility and configured to
    dynamically transition, in response to the request, from presenting the first media content instance on the display screen to presenting an interactive portal on the display screen, the interactive portal comprising both a continued presentation of the first media content instance and the first enhanced content,
    dynamically update the first enhanced content presented within the interactive portal as the first media content instance transpires,
    dynamically transitioning from the first media content instance to a second media content instance configured to serve as a gateway to second enhanced content related to and temporally synchronized with the second media content instance, and
    dynamically modifying, in response to the dynamically transitioning from the first media content instance to the second media content instance, the interactive portal to include the second enhanced content related to and temporally synchronized with the second media content instance.

24. The method of claim 11, wherein the dynamically increasing comprises bringing in at least one additional instance of enhanced content from a perimeter of the interactive portal.

25. The method of claim 4, wherein the social media content comprises at least one option that enables the user to indicate that the user likes at least a portion of the first media content instance.

* * * * *